Figure 1:
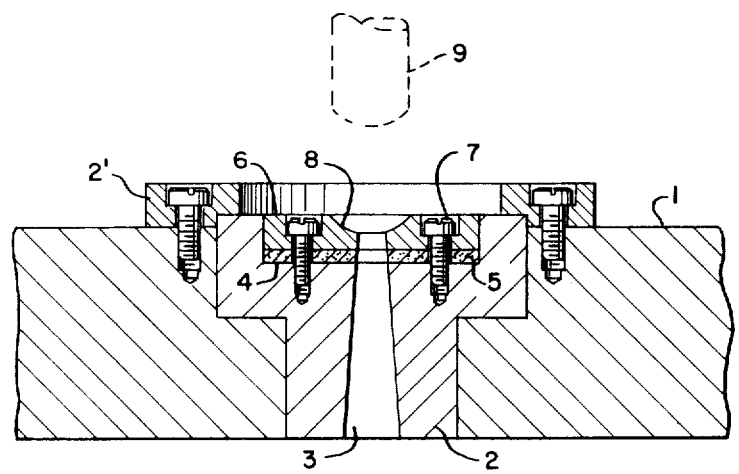

United States Patent

Czerski

[15] 3,698,849

[45] Oct. 17, 1972

[54] INJECTION MOLDING ASSEMBLY

[72] Inventor: Jan Czerski, Crewe, England

[73] Assignee: Shell Oil Company, New York, N.Y.

[22] Filed: April 8, 1969

[21] Appl. No.: 814,365

[30] Foreign Application Priority Data

April 11, 1968 Great Britain..........17,521/68

[52] U.S. Cl. ..................425/247, 164/303, 425/449
[51] Int. Cl. ..............................................B29f 1/022
[58] Field of Search...... .18/30 WD, 30 NM, 30 NA, 18/30 NB, 30 NZ, 30 RM; 164/303, 312, 316

[56] References Cited

UNITED STATES PATENTS

| | | | |
|---|---|---|---|
| 2,698,464 | 1/1955 | Wilson | 18/30 WD X |
| 2,928,125 | 3/1960 | Smucker et al. | 18/30 NB X |
| 3,169,199 | 11/1963 | Hardy | 18/30 RM |
| 3,134,141 | 5/1964 | Hardy | 18/30 RM |
| 3,504,733 | 4/1970 | Smith | 18/30 WD |

FOREIGN PATENTS OR APPLICATIONS 1,399,530  4/1965  France ....................18/30 NB Primary Examiner—J. Spencer Overholser
Assistant Examiner—Michael O. Sutton
Attorney—Joseph W. Brown and Martin S. Baer

[57] ABSTRACT

Cellular organic polymer articles are made by an injection molding method in which a foamable thermoplastic melt is injected from an extruding device through a nozzle and sprue bush into a mold, the sprue bush being thermally insulated from the injection nozzle and the nozzle being closed at a position near its outlet after the filling step and maintained in injection position throughout the molding cycle.

1 Claim, 2 Drawing Figures

PATENTED OCT 17 1972                    3,698,849

INVENTOR:
JAN CZERSKI

BY: Martin S. Baer

HIS ATTORNEY

INJECTION MOLDING ASSEMBLY

The present invention is concerned with the manufacture of cellular articles from thermoplastic compositions by injection molding, with the resulting cellular articles and with machinery suitable for use in the manufacture thereof. The term "thermoplastic composition" is used herein to include compositions of organic polymers which have thermosetting properties, for example, epoxy resins, but which are thermoplastic under the conditions of, or at the stage of, injection molding, as well as compositions of thermoplastic polymers, such as polyolefins.

Such cellular articles are formed from a melt of a foamable thermoplastic composition. Such a foamable thermoplastic composition contains a "foaming agent" which, under appropriate conditions, will generate a cellular structure within said thermoplastic composition. The foaming agent may be a volatile, normally-liquid substance, for example, technical pentane. Foaming agents of this kind are known in the art for making expanded, i.e., cellular or foamed, polystyrene. Preferably, the foaming agent is of the chemical type, i.e., a substance or mixture thereof which, for example, under elevated temperature conditions will form a gas, for example, carbon dioxide or nitrogen, capable of forming the required cellular structure in a thermoplastic material. Foaming agents of this kind are known in the art for making, for example, cellular polyolefins and polystyrene. Whatever the kind of foaming agent used, the foaming depends upon the generation or release within the molten mass of a large number of discrete bubbles of gas or vapor which, as the pressure on the mass is decreased, expand to form the cells of the ultimate cellular article.

It has been found possible to manufacture cellular articles from foamable thermoplastic compositions by injection molding. The known method and apparatus for injection molding of foamable thermoplastic compositions is described in U.S. Pat. No. 3,268,636 to Angell, Jr. In the apparatus illustrated in said patent, foamable mixture is extruded into an accumulator chamber through a three-way valve and the mold is charged from the accumulator, through the same valve, in a quick surge of expanding polymer composition.

The present invention is directed to an improved method and apparatus for injection molding foamed thermoplastic compositions, and particularly to an improved arrangement of connecting the source of foamable melt to the mold. The invention is based on the finding that, in charging a mold with a hot, foamable thermoplastic melt, improved results are obtained if, after the mold has been charged, the injection nozzle is closed at a point as near as is practical to the nozzle outlet and the nozzle is held permanently in the injection position. It was found that if the nozzle is retracted after injection, in accordance with conventional injection molding practice, the foamable composition remaining in the sprue tends to expand in the direction of the nozzle and to unite with the molten material in the nozzle tip; solidification thereof makes it difficult or even impossible to remove the molded cellular article from the mold in the normal way. However, it was also found that maintenance of the nozzle permanently in the injection position poses difficulties in cooling the sprue area and the adjacent part of the mold, since the heat is transferred from the injection nozzle to the sprue bush and mold.

According to one aspect of the present invention, a method of manufacturing a cellular article by injection molding comprises charging a mold with a melt of a foamable thermoplastic composition through a sprue bush which is thermally insulated from the injection nozzle of the injection molding machine, closing said nozzle at its outlet end while maintaining said nozzle in its injection position throughout the molding cycle; and removing the molded cellular article. The present invention also includes the resulting cellular article.

Preferably, said thermal insulation is provided by an insulating element, suitably an apertured layer or disc of thermally insulating material disposed within a recessed portion of the sprue bush, and a correspondingly apertured metal retaining element between said insulating material and the nozzle outlet, the outer surface of said retaining element being recessed for the reception of the outlet end of the nozzle. Said insulating element can be formed in situ from a layer of thermally insulating material which is pressed into a recessed portion of the sprue bush and apertured for the passage of foamable melt by movement of the nozzle into its injection position followed by the injection of melt from said nozzle.

If desired, the sprue bush and mold can be cooled in conventional manner by the circulation of a heat transfer liquid through appropriate cooling channels therein, but it is a particular advantage of the present invention that the above-defined method of manufacturing cellular articles can be carried out using molds of simple construction in which special provision for cooling the sprue bush area is not needed. For example, it has been found that the injection pressures required when injection molding cellular polyolefin articles are such that relatively cheap molds made, for example, from cast aluminum, can be used. It is, of course, advantageous in such case to be able to avoid increasing the mold cost by dispensing with special means for effecting cooling of the sprue area after injection of the charge of foamable thermoplastic composition. Such molds can be cast in two or more components, usually in two mating halves, one of which is provided with an integral pillar or collar portion which constitutes the sprue bush. Alternatively, a separate sprue bush can be used and removably secured to the appropriate mold component prior to mounting the mold in the injection molding machine. In such case, a common sprue bush can be interchanged between different cast molds, and in this way some capital cost advantage in respect of the molds can be obtained; such a sprue bush may have provision for cooling, if desired, but this is not essential. Advantageously, however, the sprue bush forms an integral part of one of the cast mold components for simplicity in setting up the injection molding machine.

The thermal insulation provided between the sprue bush and the injection nozzle is such that, apart from the necessary feed passage between the nozzle outlet and the sprue channel, which feed passage forms in effect a short rearward extension of the sprue channel, there is no "dead volume" in which foamable melt can accumulate and cause trouble by foaming when pressure is removed and the molding ejected. For this reason, the use of an air space to reduce heat transfer, for example, by arranging for the nozzle to enter a cavity in the sprue bush which is of greater diameter than the nozzle and extends inwardly of the sprue bush beyond the injection position of the nozzle, is unsuitable because in operation the space between the nozzle and the cavity wall becomes filled with foamable melt. In carrying out the present invention, the required thermal insulation conveniently comprises a layer or disc of thermally insulating material disposed wholly or partly within a recessed portion of the sprue bush surrounding the sprue channel in the surface of the sprue bush which would normally be contacted by the injection nozzle, the layer of insulating material being apertured for the passage of foamable melt therethrough. Said layer can be formed, for example, at the commencement of an injection molding run by interposing a thin sheet of insulating material, for example, polytetrafluorethylene or a resin-bound asbestos composition, between the nozzle and the dished sprue bush so that forward movement of the injection nozzle into its operative position followed by melt injection forms the required annulus in situ; however, the insulation is preferably preformed and inserted into the sprue bush prior to or during setting up of the machine.

The present invention can be applied to the molding of a wide variety of cellular articles, for example, containers such as open-topped boxes and cases, for which lids may also be molded in a separate operation, and vessels such as bowls.

Suitable thermoplastic polymers for use in this invention include, for example, olefin polymers and copolymers such as polyethylene, polypropylene and ethylene/propylene copolymers; polystyrene and vinyl resins, including acrylonitrile/butadiene/styrene (ABS) polymers; the nylons and polycarbonates. The invention can also be employed in the molding of hardenable or thermosetting resin compositions which are thermoplastic under the conditions of, or at the stage of, injection molding, for example, epoxy resins. The term "thermoplastic composition" is used herein to include resins or polymers as such or containing additives, for example, stabilizers, antioxidants and coloring matter, as well as compositions comprising significant amounts of other components, for example, fillers.

The foamable thermoplastic composition may comprise as the "expanding" or "foaming" agent any known or suitable thermally or chemically decomposable or volatilizable foaming agents. Decomposable foaming agents include organic azo and nitroso compound, e.g., an azodicarbonamide which decomposes on heating to yield nitrogen or carbonates or bicarbonates which decompose to yield carbon dioxide. Volatilizable foaming agents include volatile, normally-liquid organic substances such as hydrocarbons and halogenated hydrocarbons, e.g., technical pentane. A foaming agent which yields nitrogen or carbon dioxide on heating is preferred from the fire hazard point of view. A so-called foam nucleating agent, which may be a finely-divided inert substance, for example, calcium silicate, may also be present, if desired, to aid formation of the desired foam structure.

The foaming agent can be mixed with a thermoplastic composition at any convenient and suitable stage, for example, within the screw plasticizing section of a suitably modified screw pre-plasticizing injection molding machine in the case of a foaming agent such as pentane, or by homogeneously mixing it with the polymer prior to feeding it to the machine in the case of a foaming agent which decomposes to yield a gas on heating.

Usually a thermoplastic composition containing the required foaming agent, and optionally a nucleating agent, will be supplied as such to the molder.

The kind of injection molding machinery which can be used in carrying out the present invention can be conventional to the extent that machines are available commercially which have a large "shot" capacity and are adapted to permit rapid injection of the charge into the mold, have provision for closing the injection nozzle at its outlet end at a desired stage in the molding cycle, and have means for retracting the nozzle, which means can be adjusted, in accordance with the present invention, to maintain the nozzle in the injection position throughout the molding cycle. Preferably, the injection nozzle is closable at a position as near as possible to the nozzle outlet. If desired, one can use an injection molding machine having a reservoir into which foamable thermoplastic composition can be fed and maintained under pressure sufficient to prevent foaming thereof until enough material to constitute the charge has been built up in the reservoir; the charge is then transferred rapidly from the reservoir to the mold. Suitable injection molding machines may be designed on the basis of the requirements referred to herein, or existing types of machine, where basically suitable, can be modified to meet these requirements, whichever is the more convenient. In either case, provision is made for thermal insulation between the nozzle and the sprue bush in the manner indicated herein.

The present invention also includes a machine suitable for use in the manufacture of cellular plastics articles from a melt of a foamable thermoplastic material by injection molding, which comprises an injection molding machine having a valved injection nozzle adapted to remain in its injection position with respect to the sprue bush of a mold during the whole of the molding cycle, said nozzle being thermally insulated from said sprue bush by an insulating element between the outlet end of the nozzle and the sprue bush, which element is apertured for the passage of foamable melt therethrough.

Said sprue bush can be a separate sprue bush or it can be an integral part of a mold component; in either case the required thermal insulation can be provided by an insulating element of the kind previously described.

Advantageously, said injection nozzle is provided with heating means for maintaining the nozzle at the required operating temperature.

The present invention also includes a mold assembly for use in a machine as just defined, which comprises a mold part fitted with or comprising a sprue bush having a recessed portion surrounding the outlet of the sprue channel on the injection side of the sprue bush, said recessed portion housing an apertured layer or the like of thermally insulating material and a correspondingly apertured metal retaining element the outer surface of which is recessed for the reception of the outlet end of an injection nozzle.

Figure 2:
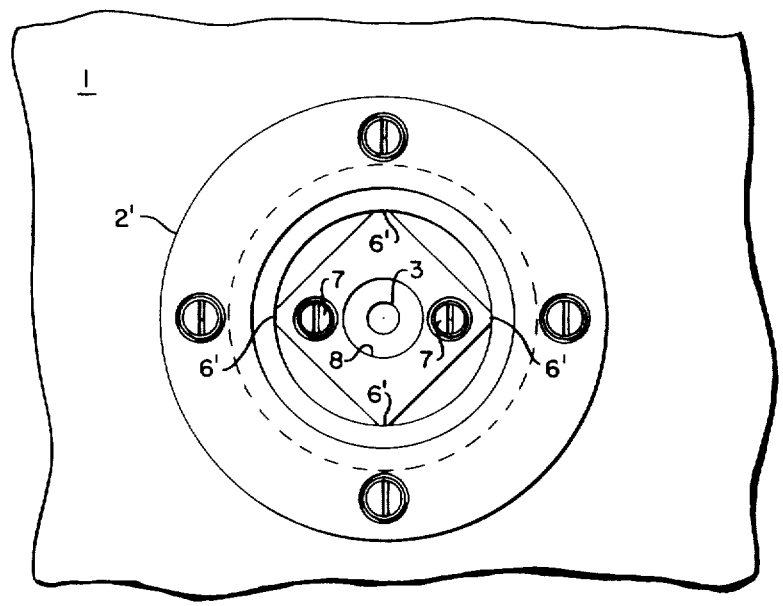

The present invention will be further described with reference to the accompanying drawings in which:

FIG. 1 is a sectional side view of part of a mold with its associated sprue bush, and FIG. 2 is a plan view of the same part.

Referring to FIG. 1, a mold back plate 1 carries a sprue bush 2 having the usual axial sprue channel 3 to the mold cavity (not shown). The sprue bush 2, which is fixed to back plate 1 by a setting ring 2¹, is recessed at 4 for the reception of an insulating element in the form of an apertured insulating disc 5 which is held in recess 4 by a retaining element in the form of a correspondingly apertured steel insert 6 secured to sprue bush 2 by screws 7. Insert 6, which is of square shape to minimize its peripheral contact with sprue bush 2, is dished at 8 to a radius matching that of the outlet end of the injection nozzle of the injection molding machine. The nozzle, which is shown in broken lines at 9, is maintained during the whole of the molding cycle with its outlet end in forced engagement with dished portion 8 of insert 6 in order to prevent leakage of foamable melt; heat transfer from nozzle 9 to sprue bush 2 is virtually eliminated by means of disc 5 and the use of a square insert 6 which contacts the sprue bush 2 only at its corners 6¹. It will be appreciated, however, that other arrangements are possible. For example, a circular insert fitting with clearance within recess 4 could be employed to retain disc 5, or the arrangement described in the following example could be used, particularly for short runs or where a mold must be adapted as cheaply as possible for operation in accordance with the present invention.

In carrying out an injection molding operation in accordance with the present invention, the melt of foamable thermoplastic composition is maintained under pressure conditions adequate to prevent undesirable foaming thereof until the charge is injected into the mold. The mold is vented to the extent that the pressure on the charge therein is such that it can foam up to form a cellular molding. The injection pressure and the gate area, i.e., the cross-section of sprue channel 3, are selected such that rapid transfer of the charge into the mold takes place, but the pressure in the mold itself does not attain high values, thereby permitting the use of the cheaper cast molds referred to previously. The optimum conditions of operation within the general conditions of operation defined herein, for example, the nozzle temperature, the melt temperature profile within the extruder and the injection pressure may be determined by trial to suit the particular polymer and foaming agent employed, and the nature of the molded cellular article to be made. Once the general conditions of operation defined herein have been satisfied, the derivation of such optimum conditions to suit the polymer used and the article made is conventional practice in the injection molding art.

The present invention is illustrated by the following example:

EXAMPLE

A cellular bowl-shaped article was molded from a foamable polyethylenic composition on a reciprocating type, single screw injection molding machine. The machine has provision for screw pre-plasticizing the polymer feed and, by appropriate forward movement of the screw when sufficient melt has been accumulated in front of it, for injecting the melt into a mold through a valved injection nozzle. The machine was modified by augmenting the hydraulic system which actuates the reciprocal movement of the screw so as to permit rapid injection of the melt into the mold and by adjustment of the operating mechanism to retain the injection nozzle in the injection position throughout the molding cycle and to provide for closure of the nozzle by means of the nozzle outlet valve as soon as injection of a charge of foamable composition had taken place. Additionally, the nozzle was provided with an electric heater and the sprue bush, which formed an integral pillar portion of the fixed mold member, was provided with a concave depression on the surface thereof which faced the injection nozzle. This depression, which housed a thermally insulating material formed therein as indicated below, was co-axial with the sprue channel, at its deepest point its depth was about 1/4 the thickness of the sprue bush. The diameter of the depression was somewhat greater than that of the nozzle.

Cellular bowls were molded from high density polyethylene of melt index 4.5 and density 0.960 g/cc, containing 1.5 percent by weight of an azo dicarbonamide foaming agent, together with 2 percent by weight of finely-divided calcium silicate as foam nucleating agent, the latter being an optional component. Before the first molding was made, a disc of a moldable insulating composition, about one-fourth inch thick, was placed between the nozzle and the sprue bush with the result that forward movement of the nozzle into the injection position formed the disc into the depression in the sprue bush, leaving the peripheral portion of the disc as an annular flanged portion bearing against the surface of the sprue bush which surrounded the depression. Injection of the first charge of foamable composition formed a central hole in the insulation continuous with the sprue channel through which the foamable composition flowed without difficulty. The insulation remained in place and unbroken during the injection molding run in which bowls were produced on a manufacturing scale. The mold used was made from cast aluminum and was maintained at a temperature of about 50°C during the run. After each injection of foamable composition, a cooling period of 80 seconds was provided before the mold was opened and the molded bowl was ejected. The main machine settings employed during the run were as follows:

| Cylinder temperatures | rear | — 180°C |
|---|---|---|
| | middle | — 220°C |
| | front | — 260°C |
| Injection nozzle temperature | | : 265°C |
| Mold temperature | | : 50°C |
| Cooling period | | : 80 seconds |

By way of comparison, bowls were molded as described above but without the insulation. Under these circumstances, the base of the ejected bowl was still very hot in the region of the sprue due to heat transfer from the injection nozzle, and this caused "post-expansion" to take place in the base of the bowl after ejection from the mold. This post expansion caused the bowl surface to rise in a bubble which was both unsightly and a source of weakness due to the larger cell size thereof; additionally, of course, it formed an irregularity in the otherwise flat bottom surface of the bowl so that the latter rocked about when placed on a flat surface. In a further comparative operation in which the injection nozzle was retracted in conventional manner after injection of the melt, the material in the sprue channel foamed rearwardly towards the nozzle and united with material at the nozzle tip, thereby preventing ejection of the molded article; this problem arose whether the insulation was present or not.

I claim as my invention:

1. In an injection molding assembly which is suitable for use in the manufacture of cellular plastics particles from a melt of a foamable thermoplastic composition and which comprises an injection molding machine having an injection nozzle and a mold assembly adapted to receive a charge through said nozzle, the improvement comprising the combination of an injection nozzle and a mold assembly wherein the injection nozzle is adapted to remain in its injection position with respect to the sprue bush of the mold assembly during the whole of the molding cycle and is insulated from the sprue bush by a thermally insulating element between the outlet end of the nozzle and the sprue bush, the insulating element being apertured for the passage of foamable melt therethrough and being disposed within a recessed portion of the sprue bush in combination with a correspondingly apertured metal retaining element between said insulating material and the outlet end of said nozzle, the outer surface of said retaining element being recessed for the reception of said outlet end of the nozzle.

* * * * *